Patented July 31, 1951

2,562,191

UNITED STATES PATENT OFFICE 2,562,191

PROCESS FOR COAGULATING SYNTHETIC LATICES

William W. Howerton, Oreland, Pa., assignor to the United States of America as represented by the Secretary of Agriculture No Drawing. Application November 19, 1948, Serial No. 61,143

7 Claims. (Cl. 260—89.5)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to me of any royalty thereon.

This invention relates to an improved process for the recovery of synthetic polymeric materials produced by emulsion polymerization of monomeric compounds in an aqueous medium. It particularly relates to the recovery of such polymeric materials from latexes containing emulsifiers consisting wholly or predominantly of sulfonate compounds.

An object of the invention is to provide a method whereby the synthetic polymeric material may be recovered from the latex by a simpler and more economical procedure than those utilized heretofore.

Another object is to provide means for coagulating and causing the separation of the polymeric material in the form of granular particles of predetermined size adapted for easy washing and further processing. Other objects and advantages of the invention will be apparent from the following description.

It is well known in the art that when synthetic polymers are produced by the emulsion polymerization method in an aqueous acid medium, water soluble alkali soaps cannot be utilized as emulsifying agents. More stable emulsifiers, which are effective in the presence of acid are required, one group of such emulsifying agents being the sulfonate compounds. By the term "Sulfonate compound" emulsifying agent, as used herein and in the appended claims, is meant a surface active compound containing a sulfonic acid group bonded to a carbon atom of an organic radical. Such emulsifying agents include, for example, aryloxy polyalkylene ether sulfonates such as octyl phenoxy ethoxy ethoxy ethyl sodium sulfonate and the like, and the aromatic and aliphatic sulfonates described in Emulsion Technology, second edition, 1946, Chemical Publishing Company, Inc., Brooklyn, N. Y., pages 326–346.

One method of coagulating the stable latexes, formed by emulsion polymerization in the presence of sulfonates as emulsifiers, consists in diluting the latex and adding a sufficient amount of a suitable coagulant such as a salt of a trivalent metal, for instance aluminum sulfate. The same result may also be attained by adding the latex to an aqueous solution of the coagulant. Either procedure causes coagulation of the latex with complete separation of the polymeric material.

I have found that latexes produced by emulsion polymerization methods wherein a monomeric substance is polymerized in an aqueous medium and in the presence of emulsifiers consisting solely or predominantly of sulfonate compounds can be thickened to the consistency of a cream by addition of a small amount of a coagulant and that the thickened latex thus obtained can be coagulated by mixing it with water, thereby causing complete separation of the polymeric material in the form of granular particles. I have further found that the average size of the particles forming the coagulum is controlled by the temperature at which coagulation is effected as well as by the procedure utilized in combining the creamy latex with water, and that the size of the granular particles can be regulated within wide limits by a proper adjustment of these conditions.

According to this invention the latex is thickened by addition of a small amount of a coagulating agent such as a salt of a trivalent metal, for example aluminum sulfate or a salt containing it such as potassium alum, sodium alum, or ammonium alum. The thickened creamy latex is then coagulated by combining it under agitation with a sufficient amount of water, either by adding the water to the latex or vice-versa.

The "thickening" process of the present invention differs from conventional creaming procedures. The usual concentration of natural rubber latex by creaming always comprises separation of the creamed latex from the aqueous dispersion medium, either by stratification, or by means of a centrifuge. In the present process no such separation takes place. On addition of the creaming agent the original emulsion becomes thick, but remains essentially uniform, and no aqueous layer is formed. Although the mechanism of the reaction involved is not fully understood, the important feature is the fact that the thus thickened emulsion is not coagulated. The polymeric material remains in the form of minute particles homogeneously dispersed throughout the body of the thickened emulsion. The term "creamy latex" is used in the description of the invention, because the thickened emulsion is similar in appearance to the concentrated latexes produced by conventional creaming procedures.

When the creamy latex is added to the water, the size of the particles forming the resulting coagulum is decreased with increasing temperature. Thus, if cold water is used the polymeric material is obtained in the form of large, firm pieces. If the temperature of the water is near the boiling point a coagulum consisting of small flocculent particles is formed. If coagulation is effected by adding the water to the creamy latex, temperature variations produce the opposite effect. Very fine, flocculent particles of the polymer are formed on addition of cold water, whereas addition of near boiling water causes separation of a coagulum consisting of large, firm pieces. In using either procedure, that is, whether the water is added to the creamy latex or vice-versa, particles of polymeric material of any intermediate size may be obtained by using water maintained at a proper temperature. Although the process may be conducted using water maintained at any temperature up to its boiling point, so as to produce particles of the size best adapted for subsequent washing and processing of the polymeric material, depending on the type of equipment utilized, most satisfactory results are usually attained if the temperature of the water used in coagulating the creamy latex is maintained at a temperature within the range of about 90° to 180° F.

The amount of coagulating agent necessary to produce the thickening to a creamy latex and subsequent coagulation of the synthetic latex by the method of this invention may vary depending on the agent used, the nature of the polymeric material and the composition of the emulsion mixture. In general, however, the amount of coagulant required is but a fraction of that needed under analogous conditions to produce separation of polymeric material by previously utilized coagulation procedures. Thus, for example, very satisfactory results are usually obtained on creaming synthetic latices by the addition of about 0.5 to 1.2% of aluminum sulfate hydrate ($Al_2(SO_4)_3 \cdot 18H_2O$) based on the latex solids and preferably added in the form of a dilute aqueous solution, and thereafter combining the creamy latex with approximately 10 times its volume of water. This quantity of coagulant corresponds approximately to one tenth of the minimum amount of aluminum sulfate required for the coagulation of synthetic latices by other methods. The present process thus, reduces substantially the cost of the coagulant and in addition yields a product which requires less washing to free it from the coagulating agent prior to further processing.

The method of this invention can be utilized in the recovery of polymeric materials produced by emulsion polymerization of unsaturated monomers in an aqueous medium in the presence of an emulsifying agent consisting of, or comprising, a predominant amount of sulfonate compounds. Such emulsifiers include for example aryloxy-polyalkylene-ether sulfonates, such as alkyl phenoxyethoxy ethoxy ethyl sodium sulfonate, sulfonates of aromatic hydrocarbons which may contain aliphatic side chains, for instance, dodecyl benzene sodium sulfonate or isobutyl naphthalene sodium sulfonate, sulfonates of long chain aliphatic hydrocarbons, or of aliphatic esters or amides like the sodium salt of sulfonated ethyl oleate or the sodium salt of sulfonated ethyl methyloleylamide. The emulsifiers may include, in conjunction with or in addition to sulfonate compounds, emulsifying agents of non-ionic type such as the fatty acid esters of lower polyhydric alcohols, fatty acid esters of higher polyhydric alcohols or of alcohol-ethers, and others which are effective in the presence of acid.

The method is applicable to the coagulation of latexes produced by any conventional emulsion polymerization method from polymerizable monomers containing the grouping

such as acrylic and alkacrylic compounds like acrylic acid, esters of acrylic or methacrylic acid and acrylonitrile; vinyl chloride, vinyl acetate, vinylidene chloride, styrene, butadiene, isoprene and the like, which may be polymerized either singly or in combination. Such latexes may have a solids content ranging from about 25 to about 65 percent and include in addition to the aforementioned emulsifiers, various stabilizing agents, catalysts or polymerization initiators and other similar substances commonly utilized in emulsion polymerization processes. Under certain conditions, for example when relatively large percentages of sulfate emulsifying agents are used in conjunction with the sulfonates, it may be desirable or necessary to buffer the aqueous solution of the coagulant, prior to adding it to the latex, in order to preclude partial coagulation of the latex on thickening to a cream. The aluminum sulfate solution can be buffered for instance by the addition of a small quantity of a non-ionic emulsifying agent. In the following examples all parts are by weight.

*Example I*

An emulsion consisting of 100 parts ethyl acrylate monomer dispersed in 100 parts of water containing 3 parts of a sodium salt of an alkylated aryl poly-ether sulfonate as the emulsifying agent, 1 part of a sodium salt of an alkyl naphthalene sulfonate as a dispersing and viscosity reducing agent, and 0.005 part of potassium persulfate as the polymerization catalyst, was polymerized by heating at reflux temperature (approximately 180–200° F.) under atmospheric pressure and with agitation, for approximately one hour. The resulting latex, having a particle size about 0.3 μ in diameter, was fluid and quite stable. 100 parts of this polyethyl acrylate latex were added with agitation to a rather hot mixture (temperature about 140° F.) of 150 parts 3% aqueous $Al_2(SO_4)_3 \cdot 18H_2O$ solution and 2000 parts of water. Coagulation occurred immediately and the polymeric material separated in the form of small granular particles somewhat resembling cottage cheese in appearance. By a series of tests wherein latexes produced by the above described procedure were coagulated at temperatures ranging from about 70° F. up to about 200° F., with various amounts of coagulating solutions of different concentration, it was established that at any temperature, within the range tested, approximately 2000 parts of water admixed with about 150 parts of a 3% aqueous aluminum sulfate solution, per 100 parts latex was the minimum amount of coagulant necessary to effect the separation of the polymeric material in a form adapted for easy washing and suitable for further processing. Larger amounts of coagulating solution containing 150 parts or more of 3% aqueous aluminum sulfate per 2000 parts of water did not improve the quality of coagulum. The use of approximately the same amount of a more dilute solution yielded a polymer which was not completely coagulated. Lesser volumes of more concentrated solutions produced rather large masses of coagulum.

Under the optimum conditions, that is, using at least 2000 parts of water and 150 parts of 3% aqueous aluminum sulfate per 100 parts of latex, the particle size of the coagulated polymeric material varied depending on the temperature of the coagulating solution. Small flocculent particles were obtained when a cold coagulating solution was used (about 70° F.) and rather large masses were formed when the temperature of the coagulating solution was about 200° F. Intermediate size particles were obtained by conducting the process at various temperatures within this range.

Example 1 describes the procedure of coagulating the synthetic latex and serves to illustrate one of the advantages of the invention. This example shows that the minimum amount of coagulating agent required to cause coagulation of the latex, by previously utilized procedures, is several times that required to attain the same result by the preferred method of Examples II—VII. According to my invention the latex is thickened by addition of a small amount of the coagulating agent and the resulting thickened latex is then coagulating by combining it with water, as described below.

Example II

An emulsion containing 100 parts ethyl acrylate monomer, dispersed in 100 parts of water containing 3 parts of an alkylated aryl poly-ether sodium sulfonate as the emulsifier, 0.5 part of an alkyl napthalene sodium sulfonate as the viscosity reducing agent and 0.005 part of potassium persulfate catalyst was polymerized as described in Example I. 100 parts of the latex thus obtained were thickened to a cream by adding, with agitation 15 parts of 3% aluminum sulfate solution. The creamy latex was coagulated by adding it with agitation to 1000 parts of water at about 140° F. The polyethyl acrylate separated in the form of small granular particles resembling cottage cheese in appearance, about 3/8" in diameter, which were readily freed of coagulant by washing with water.

Example III 100 parts of aluminum sulfate creamy polyethyl acrylate creamy latex produced as described in foregoing Example II were stirred and 1000 parts of water heated to about 140° F. were added. Coagulation occurred immediately, the resulting product being similar to the coagulum described in Example II.

Example IV 100 parts of aluminum sulfate thickened creamy latex produced as described in Example II were coagulated by adding them with agitation to 1000 parts of cold water (temperature about 70° F.). The polymeric material separated in the form of rather large masses.

Example V 100 parts of aluminum sulfate thickened creamy latex produced as described in Example II were coagulated by adding 1000 parts of cold water (temperature about 70° F.) to the latex, while stirring. The polymeric material was obtained as a fine flocculent precipitate.

Example VI 100 parts of aluminum sulfate thickened creamy latex produced as described in Example II were stirred and coagulated by the addition of 1000 parts near-boiling water. The polymeric material was obtained in the form of rather large masses.

Example VII 100 parts of aluminum sulfate thickened creamy latex produced as described in Example II were added with agitation to 1000 parts of near-boiling water. Coagulation resulted, the polymeric material being obtained in the form of a very fine, flocculent precipitate.

Example VIII

An emulsion consisting of 92.4 parts ethyl arcylate monomer and 4.8 parts chloroethyl vinyl ether dispersed in 79.6 parts of water containing 2.88 parts of a sodium salt of an alkylated aryl polyalkylene ether sulfonate, 0.96 parts of a sodium salt of an alkyl naphthalene sulfonate, and 0.0052 part of ammonium persulfate as the polymerization catalyst, was polymerized as described in Example I. 100 parts of the latex thus obtained were thickened to the consistency of a cream by adding, with agitation, 15 parts of 3% aluminum sulfate solution. The thickened creamy latex was coagulated by adding it with agitation to about 1000 parts of water at approximately 130°–140° F. The copolymer of ethyl acrylate and chloroethyl vinyl ether separated in the form of small granular particles which were readily freed of coagulant by washing with water.

Example IX 100 parts of aluminum sulfate thickened creamy latex produced as described in Example VIII were coagulated by adding them with agitation to about 1000° parts of cold water (temperature approximately 70° F.). The polymeric material separated in the form of rather large masses.

Example X 100 parts of aluminum sulfate thickened creamy latex produced as described in Example VIII were added with agitation to about 1000 parts of near-boiling water. Coagulation resulted, the polymeric material being obtained in the form of a very fine, flocculent precipitate.

Similar results were obtained on treating synthetic latices produced by emulsion polymerization of alkyl acrylates such as methyl and butyl acrylate, and of mixtures of monomeric alkyl acrylates with chloroalkyl or bromoalkylacrylates and of other monomers and monomer mixtures such as alkyl methacrylates, styrene, vinyl esters, butadiene, isoprene, and vinylidene chloride as described in the foregoing examples.

Having thus described my invention, I claim:

1. The process of claim 7 wherein the monomeric compound is an alkyl ester of acrylic acid.

2. The process of claim 7 wherein coagulation of the creamy latex is effected by mixing the creamy latex with a sufficient amount of water at a temperature of 90° to 180° F.

3. The process of recovering a polymeric alkyl acrylate from a latex containing 25 to 65 percent solids produced by aqueous emulsion polymerization of monomeric alkyl acrylate in the presence of an emulsifying agent consisting predominantly of surface active organic sulfonate compounds which comprises adding, to the latex, aqueous aluminum sulfate in an amount corresponding to 0.5–1.2 parts of $Al_2(SO_4)_3 \cdot 18H_2O$ per 100 parts latex solids and then mixing the resulting thickened creamy composition, with agitation, with about 10 times its volume of water at about 90° to 180° F. thereby causing separation of the polymeric alkyl acrylate in the form of granular particles which can be readily freed of the aluminum sulfate by washing with water.

4. The process of recovering the polymeric constituents from a latex containing 25 to 65% solids produced by aqueous emulsion polymerization of monomeric material taken from the group consisting of acrylic acid, acrylic acid esters, alkyl methacrylates, vinyl chloride, vinylidene chloride, vinyl acetate, butadiene, acrylonitrile, styrene, and isoprene, said polymerization being in the presence of an emulsifying agent comprising a surface active organic sulfonate, which comprises: adding aluminum sulfate in an amount sufficient to cause thickening to an essentially uniform cream, no aqueous layer being formed but not sufficient to cause coagulation of the latex, being not more than an amount corresponding to about 1.2 parts of $Al_2(SO_4)_3.18H_2O$ per 100 parts latex solids, followed by a step in which sufficient water is added, with agitation, to the thickened creamy latex to cause coagulation in the form of granular particles which can be readily freed of aluminum sulfate by washing with water, the temperature of the water added being between 90° F. and 180° F.

5. The process of recovering the polymeric constituents from a latex containing 25 to 65% solids produced by aqueous emulsion polymerization of monomeric material taken from the group consisting of acrylic acid, acrylic acid esters, alkyl methacrylates, vinyl chloride, vinylidene chloride, vinyl acetate, butadiene, acrylonitrile, styrene, and isoprene, said polymerization being in the presence of an emulsifying agent comprising a surface active organic sulfonate, which comprises: adding aluminum sulfate in amount sufficient to cause thickening to a cream, no aqueous layer being formed, but not sufficient to cause coagulation of the latex, being not more than an amount corresponding to about 1.2 parts of $$Al_2(SO_4)_3.18H_2O$$

per 100 parts latex solids, followed by a step in which sufficient water is added to the thickened creamy latex, with agitation, to cause coagulation of the polymeric constituent in the form of granules.

6. The process of recovering the polymeric constituents from a latex produced by aqueous emulsion polymerizations of monomeric material, comprising an alkyl acrylate, in the presence of an emulsifying agent consisting predominantly of an alkali metal aryloxy polyalkylene ether sulfonate, which comprises adding to the latex an aluminum sulfate containing salt in an amount sufficient to cause thickening to the consistency of an essentially uniform cream, no aqueous layer being formed, but not sufficient to cause coagulation, being not more than equivalent to about 1.2 parts of $Al_2(SO_4)_3.18H_2O$ per 100 parts of latex solids, and then mixing, with agitation, the thickened creamy latex with about 10 times its volume of water to effect coagulation of the polymeric material in the form of granular particles.

7. The process of recovering a synthetic polymeric material from a latex produced by aqueous emulsion polymerization of a monomeric polymerizable compound containing the grouping $$CH_2=C-$$

in the presence of an emulsifying agent comprising at least a predominant portion of a surface active organic sulfonate compound, which comprises adding to the latex aluminum sulfate in an amount sufficient to cause thickening to the consistency of an essentially uniform cream, no aqueous layer being formed; but not sufficient to cause coagulation, being in an amount corresponding to 0.5–1.2 parts of $Al_2(SO_4)_3.18H_2O$ per 100 parts latex solids and then mixing, with agitation, the thickened creamy latex with sufficient water to effect coagulation of the polymeric materials in the form of granules.

WILLIAM W. HOWERTON.

REFERENCES CITED

The following references are of record in the file of this patent:

UNITED STATES PATENTS

| Number | Name | Date |
|---|---|---|
| 2,002,622 | Williams et al. | May 28, 1935 |
| 2,338,517 | Kitani et al. | Jan. 4, 1944 |
| 2,424,648 | Bixby | July 29, 1947 |
| 2,446,115 | Svendsen | July 27, 1948 |